US011442420B2

(12) United States Patent
Wu et al.

(10) Patent No.: US 11,442,420 B2
(45) Date of Patent: Sep. 13, 2022

(54) POWER GRID REACTIVE VOLTAGE CONTROL METHOD BASED ON TWO-STAGE DEEP REINFORCEMENT LEARNING

(71) Applicant: TSINGHUA UNIVERSITY, Beijing (CN)

(72) Inventors: Wenchuan Wu, Beijing (CN); Haotian Liu, Beijing (CN); Hongbin Sun, Beijing (CN); Bin Wang, Beijing (CN); Qinglai Guo, Beijing (CN); Tian Xia, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 185 days.

(21) Appl. No.: 17/026,364

(22) Filed: Sep. 21, 2020

(65) Prior Publication Data
US 2021/0356923 A1 Nov. 18, 2021

(51) Int. Cl.
G05B 19/00 (2006.01)
G05B 19/042 (2006.01)
G06N 20/00 (2019.01)

(52) U.S. Cl.
CPC .......... *G05B 19/042* (2013.01); *G06N 20/00* (2019.01); *G05B 2219/2639* (2013.01)

(58) Field of Classification Search
None
See application file for complete search history.

(56) References Cited

U.S. PATENT DOCUMENTS

2019/0362044 A1* 11/2019 Li .......................... G06F 30/36
2020/0327411 A1* 10/2020 Shi ......................... G06N 3/006

FOREIGN PATENT DOCUMENTS

| CN | 110474339 | 11/2019 |
| CN | 110535146 | 12/2019 |
| CN | 110729740 | 1/2020 |

OTHER PUBLICATIONS

Office Action from related Chinese Appln. No. 202010412805.2, dated Apr. 30, 2021. English translation attached.
(Continued)

*Primary Examiner* — Paul B Yanchus, III
(74) *Attorney, Agent, or Firm* — Grossman, Tucker, Perreault & Pfleger, PLLC (57) ABSTRACT

A power grid reactive voltage control method and control system based on two-stage deep reinforcement learning, comprising steps of: building interactive training environment based on Markov decision process, according to a regional power grid simulation model and a reactive voltage optimization model; training a reactive voltage control model offline by using a SAC algorithm, in the interactive training environment based on Markov decision process; deploying the reactive voltage control model to a regional power grid online system; and acquiring operating state information of the regional power grid, updating the reactive voltage control model, and generating an optimal reactive voltage control policy. As compared with the existing power grid optimizing method based on reinforcement learning, the online control training according to the present disclosure has costs and safety hazards greatly reduced, and is more suitable for deployment in an actual power system.

13 Claims, 3 Drawing Sheets

(56) References Cited

OTHER PUBLICATIONS

Haoran et al., "Method for optimization and control of power grid reactive voltage in a region based on enforcement learning theory", Transactions of China Electrotechnical Society, Issue 12, vol. 30, Jun. 2015, China, pp. 408-414. English Abstract attached.

Nouri et al., "Reactive power planning in distribution systems using a reinforcement learning method", 2007 International Conference on Intelligent and Advanced Systems, Nov. 2007, Iran, pp. 157-161.

Bagheri et al., "Enhancing Power Quality in Microgrids With a New Online Control Strategy for DSTCTCOM Using Reinforcement Learning Algorithm", IEEE Access, vol. 6, Jul. 2018, Iran/Kazakhstan/Hungary, pp. 38986-38996.

Tousi et al., "Application of SARSA Learning Algorithm for Reactive Power Control in Power System", 2nd IEEE International Conf. on Power and Energy (PECon 08), Dec. 2008, Iran, pp. 1198-1202.

\* cited by examiner

POWER GRID REACTIVE VOLTAGE CONTROL METHOD BASED ON TWO-STAGE DEEP REINFORCEMENT LEARNING

This application claims priority of Chinese Patent Application entitled "Power grid reactive voltage control method based on two-stage deep reinforcement learning" filed to the Patent Office of China on May 15, 2020, with the Application No. 202010412805.2, the disclosure of which is incorporated herein by reference in its entirety.

TECHNICAL FIELD

The present disclosure relates to a technical field of power system operation and control, and more particularly, to a power grid reactive voltage control method based on two-stage deep reinforcement learning.

BACKGROUND

As installed capacity and grid-connected power generating capacity of Distributed Generation (DG) such as wind power and photovoltaics continue to increase, a power grid operation mode has undergone fundamental changes. As DG penetration rate continuously increases, distribution grids, new energy field stations, and collecting regions thereof have triggered a series of problems such as reverse power flow, voltage violations, DG tripping off and high network loss. Meanwhile, distributed generation is usually coupled to the power grid through an inverter, and as a flexible resource, has a large amount of adjustable capability. It is necessary and even obligatory for the DG coupled to the power grid to participate in an adjusting and control process of a system. At present, various smart power grid adjusting and control systems, including group control and group adjusting systems, have become key measures to improve a power grid safe operation level, reduce operation costs, and promote DG consumption. Wherein, reactive voltage control, by using reactive power capability of the flexible resource, optimizes power grid reactive power distribution, to further suppress voltage violations, and reduce network loss, which is a key module of various smart power grid adjusting and control systems.

However, current field application, including reactive voltage control, of the power grid adjusting and control systems, is usually confronted with serious model incompleteness problems, i.e., low credibility of power grid model parameters, and large-scaled and frequent changes, which result in a difficulty in preparing for maintenance of a model, and a difficulty in accurately modeling characteristic loads of access devices. In such a scenario of power grid model incompleteness, if a reactive voltage control method based on a traditional model is used, control may be performed only by using an approximate model that deviates from an actual system, and cannot guarantee optimality of control commands, which is prone to failure to suppress voltage violations and to high network loss, and will even worsen reactive power distribution of the power grid, causing safety and economic problems. Therefore, data-driven methods, for example, deep reinforcement learning methods, must be used for learning power grid characteristics online, so that optimal reactive voltage control can still be performed in the scenario of model incompleteness. However, deep reinforcement learning usually shows relatively low online training efficiency and safety. Therefore, how to improve learning efficiency and safety of a reactive voltage control network model is an urgent problem to be solved in the art.

SUMMARY

With respect to the above-described problems, the present disclosure provides a power grid reactive voltage control method and system based on two-stage deep reinforcement learning.

The power grid reactive voltage control method based on two-stage deep reinforcement learning, comprises steps of:

building interactive training environment based on Markov decision process, according to a regional power grid simulation model and a reactive voltage optimization model;

training a reactive voltage control model offline by using a SAC algorithm, in the interactive training environment based on Markov decision process;

deploying the reactive voltage control model to a regional power grid online system; and acquiring operating state information of the regional power grid, updating the reactive voltage control model, and generating an optimal reactive voltage control policy.

Preferably, the power grid reactive voltage control method based on two-stage deep reinforcement learning, further comprises steps of:

Sending the optimal reactive voltage control policy to respective controllable devices, and re-acquiring operating state information of the regional power grid.

Preferably, sending the optimal reactive voltage control policy to respective controllable devices, and re-acquiring operating state information of the regional power grid, includes:

issuing the optimal reactive voltage control policy to respective corresponding devices through a power grid remote control system;

re-acquiring power grid operating state information $s'_t$, calculating a feedback variable value $r_t$, and updating an experience library as $$D \leftarrow D \cup \{(s_t, a_t, r_t, s'_t)\};$$

Repeating acquiring operating state information of the regional power grid, updating the reactive voltage control model, and generating an optimal reactive voltage control policy.

Preferably, the power grid reactive voltage control method based on two-stage deep reinforcement learning, further comprises constructing the regional power grid simulation model, constructing the regional power grid simulation model includes:

determining an undirected graph model $\Pi(N,E)$ of the regional power grid, according to relative positions between n+1 nodes in the regional power grid, where, N=0, ..., n, which is a set of the nodes, and $E=(i,j) \in N \times N$, which is a set of the branches;

constructing a power flow calculation model of the regional power grid:

$$P_{ij} = G_{ij}V_i^2 - G_{ij}V_iV_j \cos\theta_{ij} - B_{ij}V_iV_j \sin\theta_{ij}, \forall ij \in E$$

$$Q_{ij} = -B_{ij}V_i^2 + B_{ij}V_iV_j \cos\theta_{ij} - G_{ij}V_iV_j \sin\theta_{ij}, \forall ij \in E$$

$$\theta_{ij} = \theta_i - \theta_j, \forall ij \in E,$$

wherein, $V_i, \theta_i$ are a voltage amplitude and a phase angle of node i; $G_{ij}, B_{ij}$ are conductance and susceptance of branch ij; $P_{ij}, Q_{ij}$ are active power and reactive power of branch ij; and $\theta_{ij}$ is a phase angle difference of branch ij;

constructing a node power model of the regional power grid:

$$P_j = G_{sh,i}V_i^2 + \sum_{j \in K(i)} P_{ij} = \begin{cases} -P_{Dj}, & j \in N \setminus N_{IB} \\ P_{Gj} - P_{Dj}, & j \in N \setminus N_{IB} \end{cases}$$

$$Q_j = -B_{sh,i}V_i^2 + \sum_{j \in K(i)} Q_{ij} = \begin{cases} -Q_{Dj}, & j \in N \setminus \{N_{IB} \cup N_{CD}\} \\ Q_{Gj} - Q_{Dj}, & j \in N_{IB} \\ Q_{Cj} - Q_{Dj}, & j \in N_{CD} \end{cases},$$

wherein, $P_j, Q_j$ are active power injection and reactive power injection of node j; $G_{sh,i}, B_{sh,i}$ are respectively ground conductance and susceptance of node i; $P_{Dj}, Q_{Dj}$ are active power load and reactive power load of node f; $Q_{Gj}$ is DG reactive power output of node j; $Q_{Cj}$ is static var compensator reactive power output of node j; $N_{IB}$ is a set of nodes coupled to DG, and $N_{CD}$ is a set of nodes coupled to static var compensators.

Preferably, the power grid reactive voltage control method based on two-stage deep reinforcement learning, further comprises constructing the reactive voltage optimization model,
the reactive voltage optimization model includes:

$$\min \sum_{j \in N} P_j$$
$$\text{s.t. } \underline{V_i} \leq V_i \leq \overline{V_i}, \forall i \in N$$
$$|Q_{Gi}| \leq \sqrt{S_{Gi}^2 - \overline{P_{Gi}}^2}, \forall i \in N$$
$$\underline{Q_{Ci}} \leq Q_{Ci} \leq \overline{Q_{Ci}}, \forall i \in N,$$

wherein, $\underline{V_i}, \overline{V_i}$ are a lower limit and an upper limit of a voltage of node i; $\underline{Q_{Ci}}, \overline{Q_{Ci}}$ are a lower limit and an upper limit of SVC reactive power output of node i; and $S_{Gi}, \overline{P_{Gi}}$ are DG installed capacity and an active power output upper limit of node i.

Preferably, building interactive training environment based on Markov decision process, according to a regional power grid simulation model and a reactive voltage optimization model, includes:
acquiring the operating state information of the regional power grid according to measured signals of the regional power grid, and constructing a Markov decision process state variable $$s=(P,Q,V,t),$$

wherein, P,Q are node active power and reactive power injection vectors; V is node voltage vector; and t is a time variable during training;
constructing a feedback variable, according to the reactive voltage optimization model $$r_t=-\Sigma_{i \in N}P_i(t)-C_V\Sigma_{i \in N}[\text{ReLU}^2(V_i(t)-\overline{V})+\text{ReLU}^2(\underline{V}-V_i(t))],$$

wherein, $C_V$ is a voltage suppression coefficient; and ReLU is a non-linear function, ReLU(x)=max(0,x);
determining an action variable, according to reactive power of controllable flexible resources $$a=(Q_G,Q_C),$$

wherein, $Q_G, Q_C$ are respectively reactive power output vectors of respective distributed generation devices and static var compensators.

Preferably, training a reactive voltage control model offline by using a SAC algorithm, includes:
constructing a reinforcement learning target function $$J=\Sigma_{t=0}^{\infty}\gamma^t(r_t+\alpha H(\pi(\cdot|s_t))),$$

wherein, $\gamma$ is a reduction coefficient; $\alpha$ is a maximum entropy multiplier; H is an entropy function; and $\pi(\cdot|s_t)$ is a policy function;
converting the form of the policy function, by using reparameterization trick, $$\tilde{a}_\theta(s,\xi)=\tan h(\mu_\theta(s)+\sigma_\theta(s)\odot\xi), \xi \sim N(0,I),$$

wherein, $\theta$ is a policy network parameter; $\mu_\theta$ and $\sigma_\theta$ are a mean value and a variance function corresponding thereto; and N(0,I) is a standard Gaussian distribution function;
defining and training a value function network model $Q^\pi(s,a)$;
training a policy network model $$\max_\theta \underset{\substack{s \sim D \\ \xi \sim N}}{E}[Q(s,\tilde{a}_\theta(s,\xi)) - \alpha \log \pi_\theta(\tilde{a}_\theta(s,\xi)|s)].$$

Preferably, defining and training a value function network $Q^\pi(s,a)$ includes steps of:
obtaining a recursive form of $Q^\pi(s,a)$ through a Bellman equation $$Q^\pi(s,a) = \underset{s',a'}{E}[R(s,a,s') + \gamma(Q^\pi(s',a') + \alpha H(\pi(\cdot|s')))];$$

calculating an estimated value of the value function network $Q^\pi(s,a)$ $$y=r+\gamma(Q^\pi(s',\tilde{a}')-\alpha \log \pi(\tilde{a}'|s')), \tilde{a}' \sim \pi(\cdot|s');$$

training the value function network, according to the estimated value y of the value function network $Q^\pi(s,a)$ $$\min(Q^\pi(s',a')-y)^2 \tilde{a}' \sim \pi(\cdot|s').$$

Preferably, the reactive voltage control model is deployed to the regional power grid online system, the time variable t is initialized, and the experience library D is initialized.

Preferably, acquiring operating state information of the regional power grid, updating the reactive voltage control model, and generating an optimal reactive voltage control policy, includes steps of:
acquiring measured signals of the regional power grid at time t, and forming a corresponding state variable $s_t=(P, Q, V, t)$;
extracting a set of experiences from the experience library D, $D_B \in D$, with a quantity of B;
updating the reactive voltage control model on $D_B$, by using the value function network and the policy network trained;
generating an optimal policy at time t, by using the updated reactive voltage control model $$a_t=\tan h(\mu_\theta(s_t)+\sigma_\theta(s_t)\odot\xi)=(Q_G,Q_C).$$

The present disclosure further provides a power grid reactive voltage control system based on two-stage deep reinforcement learning, comprising:
A training environment building module, configured to build interactive training environment based on Markov decision process, according to a regional power grid simulation model and a reactive voltage optimization model;

A training module, configured to train a reactive voltage control model offline by using a SAC algorithm;

A transferring module, configured to deploy the reactive voltage control model to a regional power grid online system; and A policy generating module, configured to acquire operating state information of the regional power grid, update the reactive voltage control model, and generate an optimal reactive voltage control policy.

Preferably, the power grid reactive voltage control system based on two-stage deep reinforcement learning, further comprises:

A continuous online learning module, configured to send the optimal reactive voltage control policy to respective controllable devices, and re-acquire operating state information of the regional power grid.

Preferably, the power grid reactive voltage control system based on two-stage deep reinforcement learning, further comprises:

A simulation model constructing module, configured to construct the regional power grid simulation model; and A reactive voltage optimization model constructing module, configured to construct the reactive voltage optimization model of the regional power grid, according to a reactive voltage control target of the regional power grid.

The control method according to the present disclosure, by using a two-stage method, makes full use of knowledge and information of an approximate model, to train the reactive voltage control model in an offline stage, so that the reactive voltage control model masters basic operation rules of the system in advance, without making a wide range of tentative actions on the actual physical system, which improves model training efficiency, and continuously updates the model after deployment to the online system; as compared with the existing power grid optimizing method based on reinforcement learning, the online control training according to the present disclosure has costs and safety hazards greatly reduced, and is more suitable for deployment in the actual power system.

In the present disclosure, based on the data-driven method, the reactive voltage control model is trained by using the efficient SAC algorithm, which not only can quickly optimize reactive power distribution of the power grid in real time, but also can continuously mine control process data online to adapt to model changes of the power grid, which, thus, avoids the problems of unqualified voltage and large network loss caused by a sub-optimal instruction generated by a traditional optimization algorithm in a scenario of model incompleteness, thereby ensuring effectiveness of reactive voltage control and improving efficiency and safety of power grid operation.

Other features and advantages of the present disclosure will be further explained in the following description, and partly become self-evident therefrom, or be understood through implementation of the present disclosure. The objectives and other advantages of the present disclosure will be achieved through the structure specifically pointed out in the description, claims, and the accompanying drawings.

BRIEF DESCRIPTION OF THE DRAWINGS

In order to clearly illustrate the technical solution of the embodiments of the present disclosure or in the prior art, the drawings that need to be used in description of the embodiments or the prior art will be briefly described in the following; it is obvious that the described drawings are only related to some embodiments of the present disclosure; based on the drawings, those ordinarily skilled in the art can acquire other drawings, without any inventive work.

DETAILED DESCRIPTION

In order to make objectives, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can obtain other embodiments, without any inventive work, which should be within the scope of the present disclosure.

Embodiment

Figure 1:
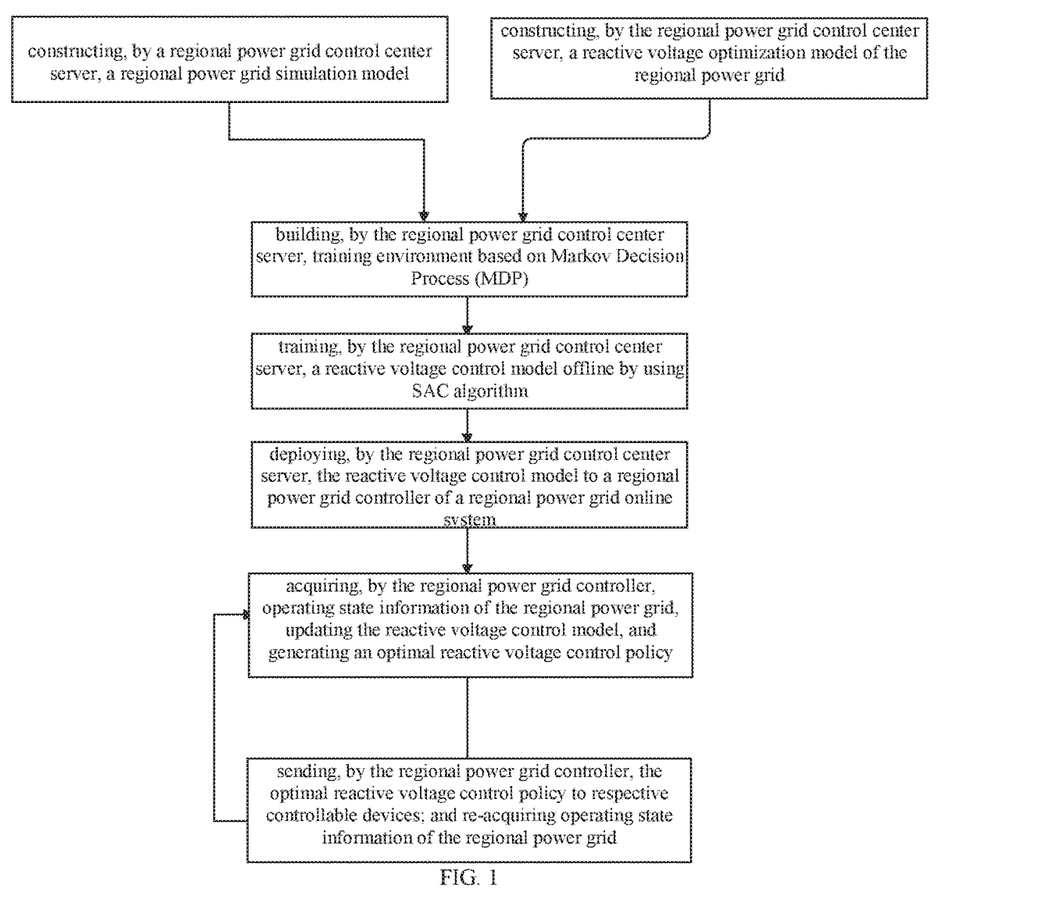
FIG. 1 shows a flow chart of a power grid reactive voltage control method based on two-stage deep reinforcement learning according to the present disclosure.

Hereinafter, by taking a regional power grid of n+1 nodes as an example, a power grid reactive voltage control method based on two-stage deep reinforcement learning according to this embodiment will be exemplarily described. Each of the nodes is provided thereon with measuring apparatuses, wherein, at least one of the nodes is further provided thereon with a Distributed Generation (DG) device, and at least one of the nodes is provided thereon with a Static Var Compensator (SVC); referring to FIG. 1, the power grid reactive voltage control method based on two-stage deep reinforcement learning comprises executing, by a regional power grid control center server, steps of:

S1: constructing a regional power grid simulation model.

wherein, the regional power grid simulation model includes an undirected graph model of the regional power grid, a power flow calculation model of the regional power grid, and a power model of the respective nodes.

specifically, the step S1 includes:

S11: determining an undirected graph model $\Pi(N,E)$ of the regional power grid, according to relative positions between n+1 nodes in the regional power grid, where, $N=0, \ldots, n$, which is a set of the nodes, and $E=(i,j) \in N \times N$, which is a set of the branches;

S12: determining the power flow calculation model of the regional power grid, including determining active power, reactive power and a phase angle difference of branches, $$P_{ij}=G_{ij}V_i^2-G_{ij}V_iV_j \cos \theta_{ij}-B_{ij}V_iV_j \sin \theta_{ij}, \forall ij \in E$$

$$Q_{ij}=-B_{ij}V_i^2+B_{ij}V_iV_j \cos \theta_{ij}-G_{ij}V_iV_j \sin \theta_{ij}, \forall ij \in E$$

$$\theta_{ij}=\theta_i-\theta_j, \forall ij \in E$$

wherein, $V_i, \theta_i$ are respectively a voltage amplitude and a phase angle of node i; $V_j, \theta_j$ are respectively a voltage amplitude and a phase angle of node j; $G_{ij}, B_{ij}$ are respectively conductance and susceptance of a branch ij; $P_{ij}, Q_{ij}$ are respectively active power and reactive power of branch ij; and $\theta_{ij}$ is a phase angle difference of branch ij.

S13: determining active power and reactive power of nodes, and establishing a node power model, the node power model including:

$$P_j = G_{sh,i}V_i^2 + \sum_{j \in K(i)} P_{ij} = \begin{cases} -P_{Dj}, j \in N \setminus N_{IB} \\ P_{Gj} - P_{Dj}, j \in N \setminus N_{IB} \end{cases}$$

$$Q_j = -B_{sh,i}V_i^2 + \sum_{j \in K(i)} Q_{ij} = \begin{cases} -Q_{Dj}, j \in N \setminus \{N_{IB} \cup N_{CD}\} \\ Q_{Gj} - Q_{Dj}, j \in N_{IB} \\ Q_{Cj} - Q_{Dj}, j \in N_{CD} \end{cases}$$

wherein, $P_j, Q_j$ are respectively active power injection and reactive power injection of node j; $G_{sh,i}, B_{sh,i}$ are respectively ground conductance and ground susceptance of node i; $P_{Dj}, Q_{Dj}$ are respectively active power load and reactive power load of node j; $P_{Gj}, Q_{Gj}$ are respectively active power output and reactive power output of DG of node j; $Q_{Cj}$ is reactive power output of a Static Var Compensator (SVC) of node j; $N_{IB}$ is a set of nodes coupled to DG; $N_{CD}$ is a set of nodes coupled to static var compensators; and K(i) is a set of correspondent nodes of all branches connected with node i. It should be noted that, $N_{IB} \cap N_{CD} = \emptyset$.

S2: constructing a reactive voltage optimization model of the regional power grid, according to a reactive voltage control target of the regional power grid, includes:

determining that a control target function is a minimum sum of node active power, and:

node voltage meets a voltage lower limit and a voltage upper limit;

SVC output of the node meets an output lower limit and an output upper limit of the SVC of the node;

An absolute value of SVC output of the node is not greater than a variance value determined according to DG installed capacity and a DG active power output upper limit.

specifically, the reactive voltage optimization model includes:

$$\min \sum_{j \in N} P_j$$
$$\text{s.t. } \underline{V_i} \leq V_i \leq \overline{V_i}, \forall i \in N$$
$$|Q_{Gi}| \leq \sqrt{S_{Gi}^2 - \overline{P_{Gi}}^2}, \forall i \in N$$
$$\underline{Q_{Ci}} \leq Q_{Ci} \leq \overline{Q_{Ci}}, \forall i \in N$$

wherein, $\underline{V_i}, \overline{V_i}$ are respectively a voltage lower limit and a voltage upper limit of a voltage $V_i$ of node i; $\underline{Q_{Ci}}, \overline{Q_{Ci}}$ are an output lower limit and an output upper limit of SVC reactive power output $Q_{Ci}$ of node i; and $S_{Gi}, \overline{P_{Gi}}$ are DG installed capacity and an active power output upper limit of node i.

S3: building interactive training environment based on Markov Decision Process (MDP), according to the reactive voltage optimization model and the regional power grid simulation model.

Specifically, the step S3 includes steps of:

S31: acquiring operating state information of the regional power grid according to measured signals of the regional power grid, wherein the operating state information including active power injection vectors, reactive power injection vectors and node voltage vectors of the respective nodes, to construct a Markov Decision Process (MDP) state variable model $$s=(P,Q,V,t),$$

wherein, P, Q are an active power injection vector and a reactive power injection vector of nodes; V is a node voltage vector; and t is a time variable during training.

S32: constructing a feedback variable model, according to the reactive voltage optimization model $$r_t = -\Sigma_{i \in N} P_i(t) - C_V \Sigma_{i \in N}[\text{ReLU}^2(V_i(t) - \overline{V}) + \text{ReLU}^2(\underline{V} - V_i(t))],$$

wherein, $C_V$ is a voltage suppression coefficient; and ReLU is a non-linear function, specifically, ReLU(x)=max (0,x). It should be noted that, a typical value of the voltage suppression coefficient is 1,000, but is not limited thereto.

S33: constructing an action vector, according to reactive power of a flexible resource, i.e., reactive power of respective Distributed Generation (DG) devices and static var compensators (SVCs).

$$a=(Q_G, Q_C),$$

wherein, $Q_G, Q_C$ are respectively reactive power output vectors of the respective distributed generation devices and static var compensators.

S4: training a reactive voltage control model offline by using a Soft Actor-Critic (SAC) algorithm. It should be noted that, the reactive voltage control model includes a value function network model and a policy network model.

S41: defining a reinforcement learning target function $$J = \Sigma_{t=0}^{\infty} \gamma^t (r_t + \alpha H(\pi(\cdot|s_t))),$$

wherein, $\gamma$ is a reduction coefficient, exemplarily, with a value of 0.95; $\alpha$ is a maximum entropy multiplier; H is an entropy function; and $\pi(\cdot|s_t)$ is a policy function, which is defined as action probability distribution under a state variable $s_t$ at time t, and is fitted by a deep neural network.

Specifically, the entropy function is:

$$H(\pi(\cdot|s_t)) = \underset{a \sim \pi(\cdot|s_t)}{E}[-\log \pi(\cdot|s_t)],$$

S42: converting a policy function form $\tilde{a}_\theta$, by using reparameterization trick, $$\tilde{a}_\theta(s,\xi) = \tan h(\mu_\theta(s) + \sigma_\theta(s) \odot \xi), \xi \sim N(0,I),$$

wherein, $\theta$ is a policy network parameter; $\mu_\theta$ and $\sigma_\theta$ are a mean value and a variance function corresponding thereto; N(0,I) is a standard Gaussian distribution function; and $\xi$ is a random variable subordinated to N(0,I).

S43: training the policy network by using the converted policy function form $\tilde{a}_\theta$, to obtain the policy network model $$\max_\theta \underset{\substack{s \sim D \\ \xi \sim N}}{E}[Q(s, \tilde{a}_\theta(s, \xi)) - \alpha \log \pi_\theta(\tilde{a}_\theta(s, \xi)|s)].$$

S44: defining and training the value function network model $Q^\pi(s,a)$.

It should be noted that, the value function network represents expected feedback under a corresponding state and action; this embodiment exemplarily gives a method for defining and training the value function network $Q^\pi(s,a)$, which is specifically as follows:

S441: writing a recursive form of $Q^\pi(s,a)$ through a Bellman equation $$Q^\pi(s, a) = \mathop{E}_{s',a'}[R(s, a, s') + \gamma(Q^\pi(s', a') + \alpha H(\pi(\cdot \mid s')))]$$

wherein, s is a state variable at time t; s' is a state variable at time t+1; a is an action variable at time t; and a' is an action variable at time t+1.

S442: calculating an estimated value of the value function network $Q^\pi(s,a)$, according to the recursive form of the value function network $Q^\pi(s,a)$, the estimated value y of the value function network $Q^\pi(s,a)$ being $$y=r+\gamma(Q^\pi(s',\tilde{a}')-\alpha \log \pi(\tilde{a}'|s'), \tilde{a}'\sim\pi(\cdot|s'),$$

wherein, ã is an estimated action variable at time t; and ã' is an estimated action variable at time t+1;

S443: training the value function network according to the estimated value y of the value function network $Q^\pi(s,a)$, to obtain the value function network model $$\min(Q^\pi(s',a')-y)^2, \tilde{a}'\sim\pi(\cdot|s').$$

S5: deploying the reactive voltage control model to a regional power grid online system, specifically, deploying the reactive voltage control model to a regional power grid controller of the regional power grid online system.

Exemplarily, the step S5 includes:

S51: deploying the reactive voltage control model formed by the value function network model and the policy network model to the online system;

S52: initializing the time variable t=0; and initializing the experience library D=ø.

Wherein, the power grid reactive voltage control method based on two-stage deep reinforcement learning further comprises executing, by the regional power grid controller, steps of:

S6: acquiring operating state information of the regional power grid, updating the reactive voltage control model, and generating an optimal reactive voltage control policy.

The step S6 specifically includes:

S61: acquiring measured signals of the regional power grid from the measuring apparatuses of the regional power grid at time t, and further acquiring the operating state information of the regional power grid at time t, to form a corresponding state variable $s_t$=(P,Q,V,t).

It should be noted that, the measuring apparatuses include voltage sensors and current sensors provided at respective nodes of the regional power grid, to acquire current signals and voltage signals of the respective nodes, and further acquire active power injection vectors, reactive power injection vectors and node voltage vectors of the respective nodes.

S62: extracting a set of experiences from the experience library D, $D_B \in D$, with a quantity of B; wherein, the experience library D contains the state variable $s_t$ of the regional power grid at time t, an optimal control policy $a_t$, the feedback variable $r_t$, and the state variable $s'_t$ of the regional power grid at time t+1.

S63: updating the reactive voltage control model, by using the value function network model and the policy network model, in combination with the set of experiences $D_B$ extracted;

S64: generating the optimal control policy at time t, by using the updated reactive voltage control model $$a_t = \tan h(\mu_\theta(s_t)+\sigma_\theta(s_t)\odot\xi)=(Q_G,Q_C).$$

S7: sending the optimal reactive voltage control policy to respective controllable devices; controlling, by the respective controllable devices, their own reactive voltage, according to the received reactive voltage control policy; re-acquiring operating state information of the regional power grid; and repeating step S6.

It should be noted that, the respective controllable devices include distributed generation devices and static var compensators provided on the respective nodes of the regional power grid.

Specifically, the step S7 includes:

S71: issuing the optimal reactive voltage control policy to respective corresponding devices through a power grid remote control system, wherein, the power grid remote control system is a software system in the power grid that is specifically configured to remotely control devices;

S72: re-acquiring power grid operating state information $s'_t$ at time t+1; calculating a feedback variable value $r_t$; and updating the experience library to $D \leftarrow D \cup \{(s_t, a_t, r_t, s'_t)\}$, Wherein, in the step, the feedback variable value $r_t$ is calculated by using $r_t = -\Sigma_{i\in N} P_i(t) - C_V \Sigma_{i\in N}[\text{ReLU}^2(V_i(t) - \overline{V}) + \text{ReLU}^2(\underline{V} - V_i(t))]$;

S73: returning to S6 and continuing operation.

Figure 2:
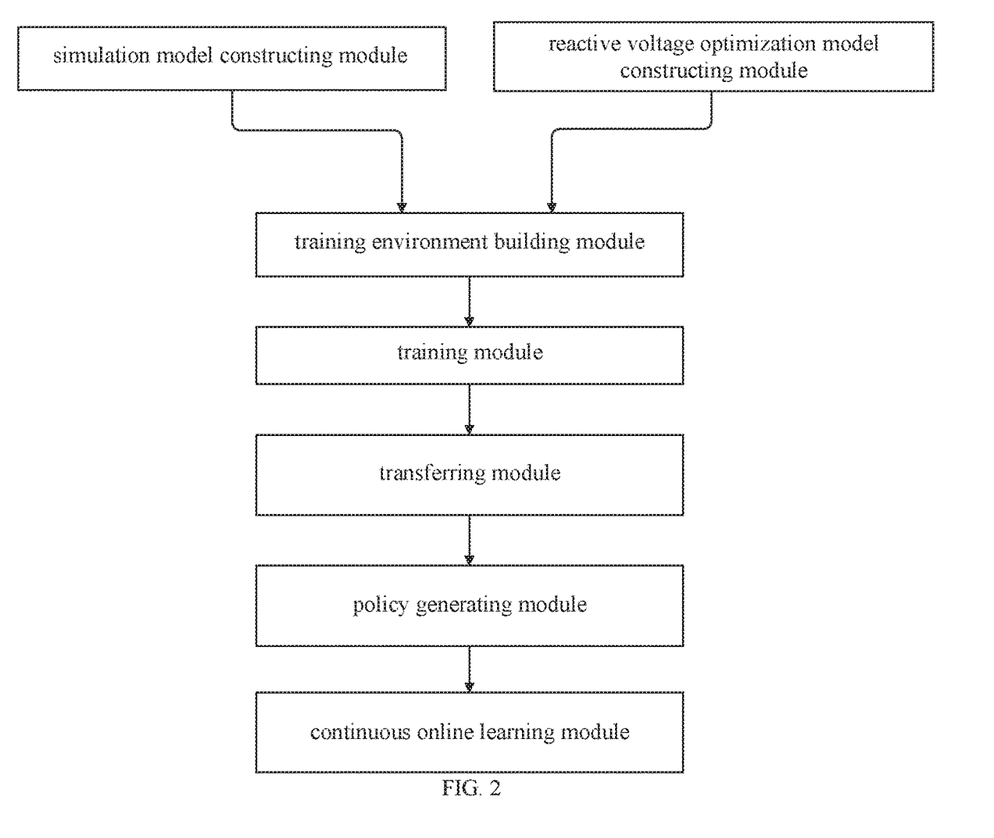
FIG. 2 shows a structural schematic diagram of a power grid reactive voltage control system based on two-stage deep reinforcement learning according to the present disclosure.

This embodiment further discloses a system for implementing the above-described power grid reactive voltage control method based on two-stage deep reinforcement learning, which is specifically the power grid reactive voltage control system based on two-stage deep reinforcement learning; referring to FIG. 2, and FIG. 2 is a form of embodiment of the power grid reactive voltage control system based on two-stage deep reinforcement learning. The power grid reactive voltage control system comprises a training environment building module, a training module and a transferring module.

Wherein, the training environment building module is configured to build interactive training environment based on Markov decision process, according to a regional power grid simulation model and a reactive voltage optimization model.

It should be noted that, the regional power grid simulation model is constructed by a simulation model constructing module. The reactive voltage optimization model is constructed by a reactive voltage optimization model constructing module according to a reactive voltage control target of the regional power grid.

Specifically, the simulation model constructing module constructs the regional power grid simulation model, and transmits the simulation model to the training environment building module; the reactive voltage optimization model constructing module, constructs the reactive voltage optimization model of the regional power grid, according to the reactive voltage control target of the regional power grid, and transmits the reactive voltage optimization model to the training environment building module. The training environment building module builds the interactive training environment based on Markov decision process, according to the regional power grid simulation model and the reactive voltage optimization model.

It should be noted that, the process that the simulation model constructing module constructs the regional power grid simulation model is the same as step S1 of the power grid reactive voltage control method based on two-stage deep reinforcement learning according to the embodiment; the process that the reactive voltage optimization model constructing module constructs the reactive voltage optimization model of the regional power grid according to the reactive voltage control target of the regional power grid is the same as step S2 of the power grid reactive voltage control method based on two-stage deep reinforcement learning according to the embodiment; and the process that the training environment building module builds the Markov decision process-based interactive training environment, according to the regional power grid simulation model and the reactive voltage optimization model is the same as step S3 of the power grid reactive voltage control method based on two-stage deep reinforcement learning according to the embodiment. In the power grid reactive voltage control method based on two-stage deep reinforcement learning according to the embodiment, steps S1, S2 and S3 have been described in detail, and will not be repeated here.

Wherein, the training module is configured to train a reactive voltage control model offline by using a SAC algorithm, that is, the training module trains the reactive voltage control model offline by using the SAC algorithm, based on the interactive training environment built by the training environment building module. The process that the training module trains the reactive voltage control model offline by using the SAC algorithm, based on the interactive training environment built by the training environment building module is the same as step S4 of the power grid reactive voltage control method based on two-stage deep reinforcement learning according to the embodiment, and no details will be repeated here.

Wherein, the transferring module is configured to deploy the reactive voltage control model to a regional power grid online system, that is, the transferring module deploys the reactive voltage control model trained by the training module to the regional power grid online system. The process is the same as step S5 of the power grid reactive voltage control method based on two-stage deep reinforcement learning according to the embodiment, and no details will be repeated here.

Specifically, the power grid reactive voltage control system based on two-stage deep reinforcement learning further comprises the policy generating module and the continuous online learning module.

Wherein, the policy generating module is configured to acquire operating state information of the regional power grid, update the reactive voltage control model, and generate an optimal reactive voltage control policy, that is, the policy generating module acquires the operating state information of the regional power grid, updates the reactive voltage control model, and generates the optimal reactive voltage control policy. The process is the same as step S6 of the power grid reactive voltage control method based on two-stage deep reinforcement learning according to the embodiment, and no details will be repeated here.

Wherein, the continuous online learning module is configured to send the optimal reactive voltage control policy to respective controllable devices, and re-acquire operating state information of the regional power grid, that is, the continuous online learning module sends the optimal reactive voltage control policy to the respective controllable devices, and re-acquires the operating state information of the regional power grid. The process is the same as step S7 of the power grid reactive voltage control method based on two-stage deep reinforcement learning according to this embodiment, and no details will be repeated here.

Figure 3:
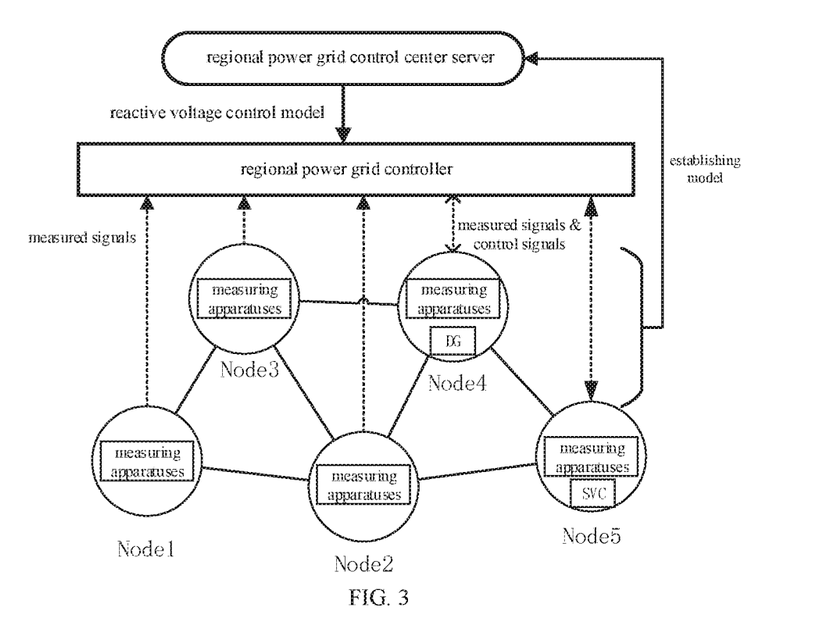
FIG. 3 shows another structural schematic diagram of the power grid reactive voltage control system based on two-stage deep reinforcement learning according to the present disclosure.

Referring to FIG. 3, this embodiment further provides another form of embodiment of the system for implementing the power grid reactive voltage control method based on two-stage deep reinforcement learning according to this embodiment. The power grid reactive voltage control system based on two-stage deep reinforcement learning comprises: a regional power grid control center server, a regional power grid controller, and a regional power grid.

Wherein, the regional power grid includes n+1 nodes, and each node is provided thereon with measuring apparatuses. It should be noted that, according to its own actual situation, the regional power grid also has one of the distributed generation device and the static var compensator provided on some or all of the nodes thereof. Specifically, the nodes of the regional power grid include three types of nodes below: nodes only provided with measuring apparatuses, nodes provided with measuring apparatuses and a distributed generation device, and nodes provided with measuring apparatuses and a static var compensator. Wherein, the measuring apparatus includes: voltage measuring apparatuses, current measuring apparatuses, and power measuring apparatuses, which are respectively configured to measure current, voltage, active power and reactive power of the respective nodes, to obtain active power vectors, reactive power vectors and voltage vectors of the nodes. The measuring apparatus may adopt voltage sensors and current sensors, but are not limited thereto.

Specifically, a power grid remote control system is used for communication between the regional power grid and the regional power grid controller. Specifically, the measuring apparatuses of the respective power grid nodes in the regional power grid transmit signals measured by the measuring apparatuses to the regional power grid controller through the power grid remote control system, the signals specifically including active and reactive power injection vectors, as well as node voltage vectors of the respective nodes. The regional power grid controller sends control signals to the distributed generation devices and the static var compensators provided on the regional power grid nodes through the power grid remote control system, and controls actions of the distributed generation devices and the static var compensators, to further control the reactive voltage.

It should be noted that, FIG. 3 only exemplarily shows 5 nodes, of which three nodes are only provided with measuring apparatuses, one node is provided with measuring apparatuses and a distributed generation device, and one node is provided with measuring apparatuses and a static var compensator. In an actual control system for implementing the power grid reactive voltage control method based on two-stage deep reinforcement learning, the number of nodes and whether a node is provided with distributed generation devices or static var compensators are both depends on an actual situation of the regional power grid, which will not be limited to the situation in FIG. 3.

Specifically, the regional power grid control center server trains the reactive voltage control model offline, and deploys the reactive voltage control model to the regional power grid controller. Specifically, the regional power grid control center server executes steps S1, S2, S3, S4 and S5. It should be noted that, the steps S1, S2, S3, S4 and S5 are the same as steps S1, S2, S3, S4 and S5 in the power grid reactive voltage control method based on two-stage deep reinforcement learning according to the embodiment, and no details will be repeated here.

Wherein, the regional power grid controller continuously learns the reactive voltage control model online, generates an optimal reactive voltage control policy, and issues the optimal reactive voltage control policy to the distributed generation devices and the static var compensators in the regional power grid. Specifically, the regional power grid controller executes step S6 and step S7; in step S6, the regional power grid controller acquires measured signals collected by the measuring apparatuses of the respective nodes in the regional power grid through the power grid remote control system. In step S7, the regional power grid controller controls voltages of the distributed generation devices and the static var compensators, according to the currently generated reactive voltage control policy, which includes: sending control signals to the distributed generation devices and the static var compensators provided on the regional power grid nodes through the power grid remote control system. It should be noted that, the steps S6 and S7 are the same as steps S6 and S7 in the power grid reactive voltage control method based on two-stage deep reinforcement learning according to the embodiment, and no details will be repeated here.

Figure 4:
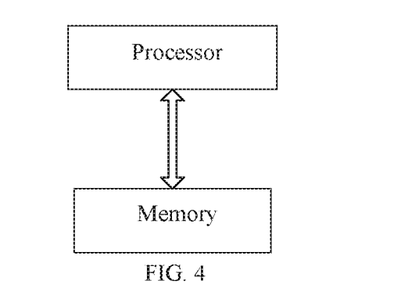
FIG. 4 shows a computer-readable storage medium according to the present disclosure.

This embodiment further proposes a computer-readable storage medium; the computer-readable storage medium stores logic instructions therein; and a processor may call the logic instructions in the computer-readable storage medium to execute the power grid reactive voltage control method based on two-stage deep reinforcement learning according to this embodiment, as shown in FIG. 4, in which one processor and one computer-readable storage medium are taken as an example.

In addition, the logic instructions in the above-described computer-readable storage medium may be implemented in a form of a software functional unit, and sold or used as an independent product.

The above-described computer-readable storage medium may be configured to store software programs and computer-executable programs, for example, program instructions/modules corresponding to the method according to this embodiment. The processor runs the software programs, instructions and modules stored in the computer-readable storage medium, so as to execute functional applications and data processing, that is, implement the method for reactive voltage control model training according to the above-described embodiment.

The computer-readable storage medium may include a program storage region and a data storage region, wherein, the program storage region may store an operating system and an application program required by at least one function; and the data storage region may store data created according to use of a terminal device, etc. In addition, the computer-readable storage medium may include a high-speed random access memory, and may further include a non-volatile memory.

The control method according to the present disclosure, by using a two-stage method, make full use of knowledge and information of an approximate model, to train the reactive voltage control model in an offline stage, so that the reactive voltage control model masters basic operation rules of the system in advance, which there is no need to make a wide range of tentative actions on the actual physical system. As compared with the existing power grid optimizing method based on reinforcement learning, the online control training according to the present disclosure has costs and safety hazards greatly reduced, and is more suitable for deployment in the actual power system.

In the present disclosure, based on the data-driven method, the reactive voltage control model is trained by using the efficient SAC algorithm, which not only can quickly optimize reactive power distribution of the power grid in real time, but also can continuously mine control process data online to adapt to model changes of the power grid, which, thus, avoids the problems of unqualified voltage and large network loss caused by a sub-optimal instruction generated by a traditional optimization algorithm in a scenario of model incompleteness, thereby ensuring effectiveness of reactive voltage control and improving efficiency and safety of power grid operation.

Although the present disclosure is explained in detail with reference to the foregoing embodiments, those ordinarily skilled in the art will readily appreciate that many modifications are possible in the technical solutions recorded in the respective foregoing embodiments, or equivalent substitutions are made for part of technical features; however, these modifications or substitutions are not intended to make the essences of the corresponding technical solutions depart from the spirit and the scope of the technical solutions of the respective embodiments of the present disclosure.

The invention claimed is:

1. A power grid reactive voltage control method based on two-stage deep reinforcement learning, comprising the steps of:
   building, by a regional power grid control center server, interactive training environment based on Markov decision process, according to a regional power grid simulation model and a reactive voltage optimization model;
   training, by the regional power grid control center server, a reactive voltage control model offline by using SAC algorithm, in the interactive training environment based on Markov decision process;
   deploying, by the regional power grid control center server, the reactive voltage control model to a regional power grid controller of a regional power grid online system; and
   acquiring, by the regional power grid controller, operating state information of the regional power grid, updating the reactive voltage control model, and generating an optimal reactive voltage control policy.

2. The power grid reactive voltage control method based on two-stage deep reinforcement learning according to claim 1, further comprising the steps of:
   sending, by the regional power grid controller, the optimal reactive voltage control policy to respective controllable devices, and re-acquiring, by the regional power grid controller, operating state information of the regional power grid,
   wherein, the respective controllable devices include distributed generation devices and static var compensators provided on the respective nodes of the regional power grid.

3. The power grid reactive voltage control method based on two-stage deep reinforcement learning according to claim 2, wherein, sending the optimal reactive voltage control policy to the respective controllable devices, and re-acquiring operating state information of the regional power grid, includes:
   issuing the optimal reactive voltage control policy to respective corresponding devices through a power grid remote control system;
   re-acquiring regional power grid operating state information $s'_t$, calculating a feedback variable value $r_t$, and updating an experience library as $$D \leftarrow D \cup \{(s_t, a_t, r_t, s'_t)\};$$

wherein, the experience library D contains the state variable $s_t$ of the regional power grid at time t, an optimal control policy $a_t$, the feedback variable $r_t$, and the state variable $s'_t$ of the regional power grid at time t+1;
   repeating the acquiring operating state information of the regional power grid, updating the reactive voltage control model, and generating an optimal reactive voltage control policy.

4. The power grid reactive voltage control method based on two-stage deep reinforcement learning according to claim 1, further comprising constructing the regional power grid simulation model by the regional power grid control center server, wherein, constructing the regional power grid simulation model includes:

determining an undirected graph model $\Pi(N,E)$ of the regional power grid, according to relative positions between n+1 nodes in the regional power grid, where, $N=0, \ldots, n$, which is a set of the nodes, and $E=(i,j)\in N\times N$, which is a set of the branches;

constructing a power flow calculation model of the regional power grid:

$$P_{ij}=G_{ij}V_i^2-G_{ij}V_iV_j \cos \theta_{ij}-B_{ij}V_iV_j \sin \theta_{ij}, \forall ij\in E$$

$$Q_{ij}=-B_{ij}V_i^2+B_{ij}V_iV_j \cos \theta_{ij}-G_{ij}V_iV_j \sin \theta_{ij}, \forall ij\in E$$

$$\theta_{ij}=\theta_i-\theta_j, \forall ij\in E,$$

wherein, $V_i, \theta_i$ are a voltage amplitude and a phase angle of node i; $G_{ij}, B_{ij}$ are conductance and susceptance of branch ij; $P_{ij}, Q_{ij}$ are active power and reactive power of branch ij; and $\theta_{ij}$ is a phase angle difference of branch ij;

constructing a node power model of the regional power grid:

$$P_j = G_{sh,i}V_i^2 + \sum_{j\in K(i)} P_{ij} = \begin{cases} -P_{Dj}, j\in N\setminus N_{IB} \\ P_{Gj}-P_{Dj}, j\in N\setminus N_{IB} \end{cases}$$

$$Q_j = -B_{sh,i}V_i^2 + \sum_{j\in K(i)} Q_{ij} = \begin{cases} -Q_{Dj}, j\in N\setminus\{N_{IB}\cup N_{CD}\} \\ Q_{Gj}-Q_{Dj}, j\in N_{IB} \\ Q_{Cj}-Q_{Dj}, j\in N_{CD} \end{cases},$$

wherein, $P_j, Q_j$ are active power injection and reactive power injection of node j; $G_{sh,i}, B_{sh,i}$ are respectively ground conductance and susceptance of node i; $P_{Dj}, Q_{Dj}$ are active power load and reactive power load of node j; $Q_{Gj}$ is DG reactive power output of node j; $Q_{Cj}$ is static var compensator reactive power output of node j; $N_{IB}$ is a set of nodes coupled to DG, and $N_{CD}$ is a set of nodes coupled to static var compensators.

5. The power grid reactive voltage control method based on two-stage deep reinforcement learning according to claim 1, further comprising constructing the reactive voltage optimization model by the regional power grid control center server, wherein, the reactive voltage optimization model includes:

$$\min \sum_{j\in N} P_j$$

$$\text{s.t. } \underline{V_i} \le V_i \le \overline{V_i}, \forall i \in N$$

$$|Q_{Gi}| \le \sqrt{S_{Gi}^2 - \overline{P_{Gi}}^2}, \forall i \in N$$

$$\underline{Q_{Ci}} \le Q_{Ci} \le \overline{Q_{Ci}}, \forall i \in N,$$

wherein, $\underline{V_i}, \overline{V_i}$ are a lower limit and an upper limit of a voltage of node i; $\underline{Q_{Ci}}, \overline{Q_{Ci}}$ are a lower limit and an upper limit of SVC reactive power output of node i; and $S_{Gi}$, $\overline{P_{Gi}}$ are DG installed capacity and an active power output upper limit of node i.

6. The power grid reactive voltage control method based on two-stage deep reinforcement learning according to claim 1, wherein, building interactive training environment based on Markov decision process, according to a regional power grid simulation model and a reactive voltage optimization model, includes:

acquiring the operating state information of the regional power grid according to measured signals of the regional power grid, and constructing a Markov decision process state variable $$s=(P,Q,V,t),$$

wherein, P, Q are node active power and reactive power injection vectors; V is a node voltage vector; and t is a time variable during training;

constructing a feedback variable, according to the reactive voltage optimization model $$r_t=-\Sigma_{i\in N}P_i(t)-C_V\Sigma_{i\in N}[\text{ReLU}^2(V_i(t)-\overline{V})+\text{ReLU}^2(\underline{V}-V_i(t))],$$

wherein, $C_V$ is a voltage suppression coefficient; and ReLU is a non-linear function, $\text{ReLU}(x)=\max(0,x)$;

determining an action variable, according to reactive power of controllable flexible resources $$a=(Q_G,Q_C),$$

wherein, $Q_G, Q_C$ are respectively reactive power output vectors of respective distributed generation devices and static var compensators.

7. The power grid reactive voltage control method based on two-stage deep reinforcement learning according to claim 1, wherein, training a reactive voltage control model offline by using a SAC algorithm, includes:

constructing a reinforcement learning target function $$J=\Sigma_{t=0}^{\infty}\gamma^t(r_t+\alpha H(\pi(\cdot|s_t))),$$

wherein, $\gamma$ is a reduction coefficient; $\alpha$ is a maximum entropy multiplier; H is an entropy function; and $\pi(\cdot|s_t)$ is a policy function;

converting form of the policy function, by using reparameterization trick, $$\tilde{a}_\theta(s,\xi)=\tan h(\mu_\theta(s)+\sigma_\theta(s)\odot\xi), \xi\sim N(0,I),$$

wherein, $\theta$ is a policy network parameter; $\mu_\theta$ and $\sigma_\theta$ are a mean value and a variance function corresponding thereto; and N(0,I) is a standard Gaussian distribution function;

defining and training a value function network model $Q^\pi(s,a)$;

training a policy network model $$\max_\theta \underset{\substack{s\sim D \\ \xi\sim N}}{E}[Q(s,\tilde{a}_\theta(s,\xi))-\alpha\log\pi_\theta(\tilde{a}_\theta(s,\xi)|s)].$$

8. The power grid reactive voltage control method based on two-stage deep reinforcement learning according to claim 7, wherein, defining and training a value function network $Q^\pi(s,a)$ includes steps of:

obtaining a recursive form of $Q^\pi(s,a)$ through a Bellman equation $$Q^\pi(s,a) = \underset{s',a'}{E}[R(s,a,s') + \gamma(Q^\pi(s',a') + \alpha H(\pi(\cdot|s')))]$$

wherein, s is a state variable at time t; s' is a state variable at time t+1; a is an action variable at time t; and a' is an action variable at time t+1;

calculating an estimated value of the value function network $Q^\pi(s,a)$ $$y = r + \gamma(Q^\pi(s',\tilde{a}') - \alpha \log \pi(\tilde{a}'|s')), \tilde{a}' \sim \pi(\cdot|s');$$

training the value function network, according to the estimated value y of the value function network $Q^{\pi(s,a)}$ $$\min(Q^\pi(s',a') - y)^2, \tilde{a}' \sim \pi(\cdot|s').$$

9. The power grid reactive voltage control method based on two-stage deep reinforcement learning according to claim 1, comprising, deploying the reactive voltage control model to the regional power grid controller of the regional power grid online system by the regional power grid control center server, initializing, by the regional power grid controller the time variable t, and initializing the experience library D.

10. The power grid reactive voltage control method based on two-stage deep reinforcement learning according to claim 9, wherein, acquiring operating state information of the regional power grid, updating the reactive voltage control model, and generating an optimal reactive voltage control policy, includes steps of:

acquiring a measured signal of the regional power grid at time t, and forming a corresponding state variable $s_t = (P, Q, V, t)$, wherein, P, Q are an active power injection vector and a reactive power injection vector of nodes, V is a node voltage vector, and t is a time variable during training;

extracting a set of experiences from the experience library D, $D_B \in D$, with a quantity of B;

updating the reactive voltage control model on $D_B$, by using the value function network and the policy network trained;

generating an optimal policy at time t, by using the updated reactive voltage control model $a_t = \tan h(\mu_\theta(s_t) + \sigma_\theta(s_t) \odot \xi) = (Q_G, Q_C)$, wherein, θ is a policy network parameter; $\mu_\theta$ and $\sigma_\theta$ are a mean value and a variance function corresponding thereto, ξ is a random variable, $Q_G, Q_C$ are respectively reactive power output vectors of the respective distributed generation devices and static var compensators.

11. A power grid reactive voltage control system based on two-stage deep reinforcement learning, comprising:

a training environment building module, configured to build interactive training environment based on Markov decision process, according to a regional power grid simulation model and a reactive voltage optimization model;

a training module, configured to train a reactive voltage control model offline by using a SAC algorithm;

a transferring module, configured to deploy the reactive voltage control model to a regional power grid online system; and a policy generating module, configured to acquire operating state information of the regional power grid, update the reactive voltage control model, and generate an optimal reactive voltage control policy.

12. The power grid reactive voltage control system based on two-stage deep reinforcement learning according to claim 11, further comprising:

a continuous online learning module, configured to send the optimal reactive voltage control policy to respective controllable devices, and re-acquire operating state information of the regional power grid.

13. The power grid reactive voltage control system based on two-stage deep reinforcement learning according to claim 11, further comprising:

a simulation model constructing module, configured to construct the regional power grid simulation model; and a reactive voltage optimization model constructing module, configured to construct the reactive voltage optimization model of the regional power grid, according to a reactive voltage control target of the regional power grid.

* * * * *